United States Patent

Yee et al.

Patent Number: 6,016,385
Date of Patent: Jan. 18, 2000

[54] REAL TIME REMOTELY CONTROLLED ROBOT

[75] Inventors: Albert G. Yee, Union City, Calif.; Hadi A. Akeel, Rochester Hills, Mich.

[73] Assignee: Fanu America Corp, Union City, Calif.

[21] Appl. No.: 08/905,016

[22] Filed: Aug. 11, 1997

[51] Int. Cl.$^7$ .................................. G05B 15/00
[52] U.S. Cl. ........................... 395/80; 446/327; 446/328; 446/329; 446/330; 395/99; 395/98
[58] Field of Search ................................. 395/80; 358/93

[56] References Cited

U.S. PATENT DOCUMENTS

| | | | |
|---|---|---|---|
| 4,130,873 | 12/1978 | Fioretta | 364/513 |
| 4,142,211 | 2/1979 | Farouda | 358/167 |
| 4,481,569 | 11/1984 | Hoodbhoy | 364/183 |
| 4,600,869 | 7/1986 | Sekine | 318/568 |
| 4,604,559 | 8/1986 | Hawkes | 318/563 |
| 4,694,230 | 9/1987 | Slocum | 318/568 |
| 4,715,773 | 12/1987 | Parker | 414/730 |
| 4,744,719 | 5/1988 | Asano | 414/730 |
| 4,928,047 | 5/1990 | Arai | 318/568.16 |
| 4,954,952 | 9/1990 | Ubhayaka | 364/513 |
| 4,980,839 | 12/1990 | Souji | 364/513 |
| 5,021,878 | 6/1991 | Lang | 358/93 |
| 5,086,400 | 2/1992 | Hayati et al. | 395/95 |
| 5,155,423 | 10/1992 | Karlen et al. | 318/568.11 |
| 5,157,316 | 10/1992 | Glovier | 318/568.11 |
| 5,231,693 | 7/1993 | Backes et al. | 395/99 |
| 5,299,288 | 3/1994 | Glassman | 395/80 |
| 5,371,836 | 12/1994 | Mitomi . | |
| 5,459,382 | 10/1995 | Jacobus et al. | 318/568.11 |
| 5,469,531 | 11/1995 | Faure . | |
| 5,515,478 | 5/1996 | Wang . | |
| 5,581,666 | 12/1996 | Anderson | 395/98 |
| 5,625,576 | 4/1997 | Massie et al. | 364/578 |
| 5,807,284 | 9/1998 | Foxlin | 600/595 |
| 9,453,085 | 6/1984 | Pryor | 250/203 |

*Primary Examiner*—William Grant
*Assistant Examiner*—Victoria Robinson
*Attorney, Agent, or Firm*—Robert Samuel Smith

[57] ABSTRACT

A robot system including a robot, an operator control center and having a communication system connecting the robot and control center wherein an operator in the control center responds with natural movements to stimulus signals from the robot environment by issuing commands that control the robot. In one embodiment, the operator occupies a command chair with an exoskeletal arm that is secured to the "shoulder" (backrest) of the chair. The operator slides his hand into a glove of the invention attached to the end of the exoskeletal arm. He views the robot environment through a video screen and exerts control in response to views presented on the screen. The communication system sends signals to the operator glove in response to conditions at the robot site prompting the operator to take appropriate action.

25 Claims, 5 Drawing Sheets

REAL TIME REMOTELY CONTROLLED ROBOT

FIELD OF THE INVENTION

This invention relates to remote controlled robots and particularly toward a robot that is controlled by an operator reacting to feedback signals originating from the robot.

BACKGROUND AND INFORMATION DISCLOSURE

A robot is generally understood to mean a device or system which performs a task predefined by a human where the human exerts control indirectly such as by programming the robot to do the job before the robot actually performs the job or such as exerting control over the robot from a remote location using an intermediate control system.

An important problem with directing the activities of a robot by remote control is to reduce the length of time and effort required to train an operator how to operate the control system. The ideal solution to this problem would be a system where the robot senses conditions in robot environment in exactly the same way that a human would sense the conditions, sends signals to the operator which the operator senses in exactly the same way as if he were to take the place of the robot, and then sends signals back to the robot by reacting in a human way to the signals transmitted by the robot. In such a system, the operator would issue many commands to the robot subconsciously as a natural reaction to signals received from the robot.

A robot that performs functions in a very hulnanesque manner would be useful in a number of environments. One environment would be a commercial environment such as a department store or a recreational area where a robot might be used as an attraction to the public by greeting the public, directing traffic or handing out pamphlets or treats. Another environment might include a "clean room" such as a hospital operating room or a semiconductor manufacturing site where it is desirable to exclude excessive human presence to prevent any degree of contamination.

It is therefore desireable to have the robot project a human-like presence at locations remote from an operator who may sense the robot environment through sensing signal communicated by the robot to the operator and communicate command signals to the robot to act in response to the environment. For this coordinated operator-robot responses, the remote robot is hereby called an "antiphon".

Some members of the public are somewhat intimidated by a machine (robot) that performs operations normally performed by humans but lacks "humanesque" characteristics. Most members of the public are fascinated by inanimate devices that resemble humans in performing their operations. For these reasons, it is desirable in these applications to make the robot as "humanesque" as possible.

Numerous patents have issued related to robot technology.

U.S. Pat. No. 4,130,873 discloses an articulated mechanical arm capable of movement and having a set of transducers for signals representing movement when it is manually displaced in an initial "teaching" operation and using the signals to repeat the movement.

U.S. Pat. No. 4,453,085 to Pryor discloses an electro-optical system for monitoring the positioning of a movable arm.

U.S. Pat. No. 4,481,569 to Hoodbhoy discloses a feedback system for a robot controller in which feedback signals from the robot to the controller are used to make positioning of the robot more accurate.

U.S. Pat. No. 4,600,869 to Sekine et al discloses a device for inputting coordinates of a robot position using a sensor.

U.S. Pat. No. 4,604,559 to Hawkes et al discloses a robot controlled by a user wherein an audio signal is fed back from the robot to the user regarding force and movement parameters of the robot operation.

U.S. Pat. No. 4,694,230 to Slocum et al discloses a precise positioning device including means for detecting an opposition force.

U.S. Pat. No. 4,715,773 to Parker et al discloses a robot having a robot hand with a pair of opposing finger in which force exerted between the robot fingers is sensed using strain gages and used to control motion of the fingers.

U.S. Pat. No. 4,744,719 to Asano et al discloses a multi-joint arm having motors for controlling joint angles.

U.S. Pat. No. 4,928,047 to Arai et al discloses a multiple degree of freedom manipulator having a plurality of joints, some of the joints having brakes, and other joints having actuators in which the braking is determined by torque signals from the actuators.

U.S. Pat. No. 4,954,952 to Ubhayaka et al discloses a flexible multi digit arm with a set of fingers in which operation of the arm is radio controlled.

U.S. Pat. No. 4,980,839 to Souji et al discloses a robot having a rotary encoder for monitoring position of the arm.

U.S. Pat. No. 5,142,211 to Tan discloses a five axis robot including three translational and two rotational degrees of freedom.

U.S. Pat. No. 5,155,423 discloses a robot comprising a set of unitized joint modules assembled in series to form an arm utilizing feedback control derived from sensing torque on each unit.

U.S. Pat. No. 5,157,316 to Glovier discloses a robotic joint in which each joint carries a motor and is attached directly to the shaft of another motor. Each motor turns in accordance with the resistance to turning of the shaft.

U.S. Pat. No. 5,299,288 to Glassman et al discloses an image directed robot system for surgical applications including an optical tracking camera supplying data to the controlling processor.

U.S. Pat. No. 5,371,836 discloses a robot and method including memorizing a path taken by an extremity of the robot and a gripping position monitored by a video display, U.S. Pat. No. 5,469,531 to Faure et al discloses a robot manipulator controlled by a combination of displacement and force actuators.

U.S. Pat. No. 5,515,478 to Wang discloses an automated endoscope system for optimal positioning featuring foot pedal control of the endoscope.

None of the cited art discloses a control of a robot by a human using movement that is natural to the operator. For example, it is not "natural" to extend an endoscope by depressing a footpedal. As another example, in a lifting operation, it is normal for a human to adjust the force of his lift in accordance with his sense of the force that he is overcoming to lift an object.

OBJECTS

Accordingly, it is an object of this invention to:

develop a robot system in which control of the robot by the operator is accomplished by the robot duplicating the actions and motion of the operator;

expand the capabilities of a robot to sense conditions in the robot environment and to transmit the information back to an operator to modify the operation of the robot in accordance with changed conditions. This object includes a capability to emphasize select components of a signal such as a particular frequency component of an audio signal in order to direct more urgent operator attention to the cause of the particular frequency component;

enable die operator to communicate not only with the robot regarding modifications of a robot control program but also to be able to communicate with one or more associates in the robot environment regarding contemplated changes of the program;

fashion the signals emanating from the robot to interact physically with corresponding human senses to enable the human operator to respond more naturally, more effectively and more quickly to developing conditions at the robot site;

provide an antiphon that reflects the behaviour of a human operator in terms of the way it moves and responds to external influences except that it could have certain abilities (such as great strength or an ability to withstand high temperatures) that are "superhuman";

SUMMARY

This invention is directed toward a tele-operated intelligent robot system comprising a control console/chair/center, an antiphon, and communications apparatus and methods between the two. A person controls the antiphon (robot) by moving in a normal fashion. As the person moves, the antiphon mimics his motions and actions. The antiphon is controlled by the operator moving in a normal manner such as to generate commands to the antiphon in response to conditions detected in the antiphon environment and transmitted to the operator.

The antiphon generates sensory signals in response to its interaction with the environment and relates such signals to actuators that give the operator the same sensory feelings providing that both the operator and the antiphon exchange sensory as well as command signals.

DESCRIPTION OF THE BEST MODE

Figures 1, 2, 3:
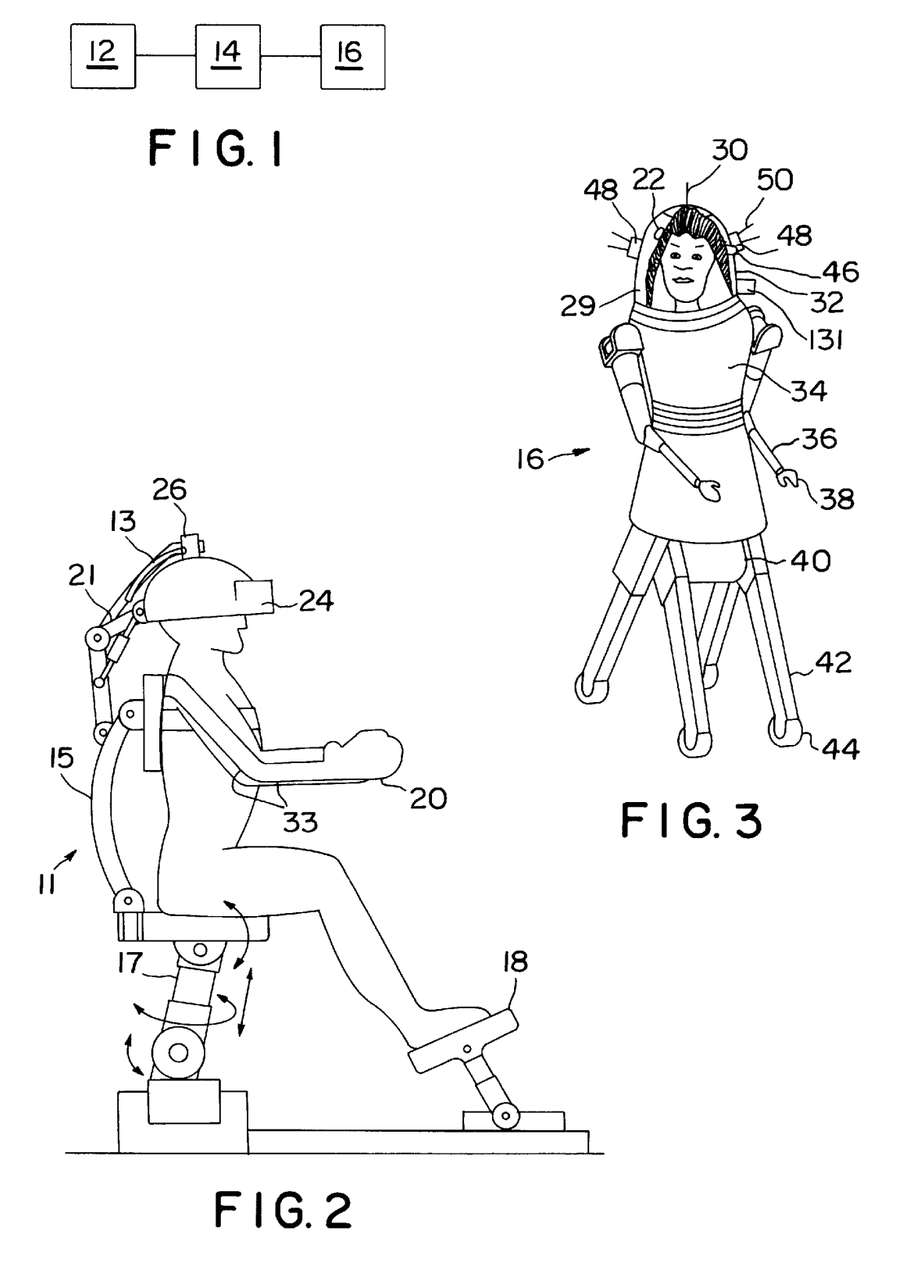
FIG. 1 shows the components of the robot system.
FIG. 2 shows the command station.
FIG. 3 shows the antiphon.

Turning now to a discussion of the drawings, FIG. 1 shows the system 10 as including three major sections, i.e., a command station 12 from whence an operator issues commands to the antiphon unit 16 which performs according to the commands issued by the command station 12. The antiphon control unit 16 gathers information concerning the robot environment, and a communication system 14 which transmits the commands from command station 12 to the antiphon 16 and transmits back to the command control unit information related to conditions at the antiphon site. The antiphon 16 sends back to the command station 12 signals related to visual, auditory, thermal and haptic conditions in the antiphon's surroundings.

FIG. 2 shows one embodiment in which the command station 12 includes a command chair 11 in which the operator sits wearing a "virtual reality" helmet 13. His hand is in a "force reflecting" glove 20 mounted on one end of an exoskeletal arm 33 whose other end is hingably attached to the backrest 15 of chair 11 Exoskeleton arm 33 includes upper arm section 33A and forearm section 33B. Chair 11 also has a telescoping multirotational support base 17 and foot pedals 18.

The virtual reality helmet 13 is mounted on the chair 11 by a counter weight system 21 constructed so that the user does not have to carry the entire weight of the helmet 13.

FIG. 3 shows an assembly view of the antiphon system 16 which includes a head 29 with a communications antenna 30, a video display 32. The head 29 is rotatably mounted on a torso 34 with a pair of arms 36, each arm 36 having a hand 38. The torso 34 has attached section 40 where the drives and power supply are stored. Telescoping legs 42 with individually drivable casters 44 are shown for providing mobility. Other mechanisms such as ones with only two human-like legs and augmented with balancing means for stability of posture may, of course, be utilized.

The command station 12 includes a backrest 15, telescoping arm 33, support base 17 and foot pedals 18 (FIG. 2) are instrumented with position sensors (not shown) so that motions of the user are sent as motion commands to the robot 16 and are also equipped with actuators and sensors (actuators and sensors not shown) so that force and other sensory feedback signals generated by motion of the robot as it interacts with its environment result in a corresponding force and sensory feedback to the user.

Figure 4:
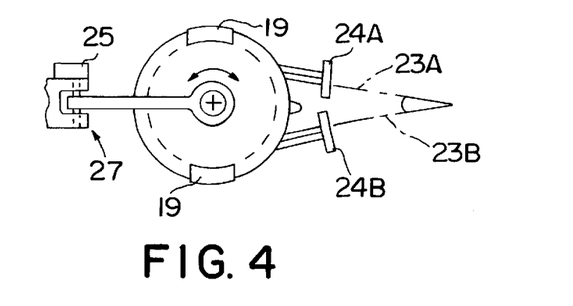
FIG. 4 shows a top view of the helmet.
Figure 5:
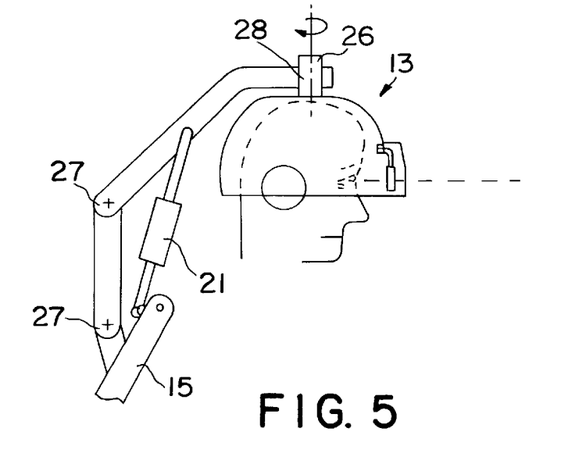
FIG. 5 shows a side view of the helmet.

FIG. 4 is a top view and FIG. 5 is a side view showing details of the virtual reality helmet 13 which gives the user visual and auditory feedback. FIG. 5 shows the helmet 13 mounted on the backrest 15 of chair 11 by a linkage including hinge 27 biased with a counter weight system 21 constructed so that the user does not have to carry the entire weight of the helmet 13. Rotary encoders 25 sense rotation of joints 27 when the operator bends his neck and rotary encoder 26 senses rotation of rotary joint 28 when the operator turns his head about axis 33.

The helmet 13 is provided with two earphones 19 one for each ear of the operator. Correspondingly, the rotatable robot head 29 (FIG. 3) is provided with two microphones 48 that pickup sound generated in the robot environment. Each of the microphones 48 has a horn 50 designed to provide a directional response in which the direction of maximum response of each horn 50 is different from the direction of maximum response of the other horn 50. The audio signal received by one microphone 48 is converted to an electrical signal and transmitted by one AM (amplitude modulated) frequency through communication system 14 to a receiver inside helmet 13 (FIG. 1) in the control unit 12 which delivers the signal to one earphone 19 (FIG. 4) of the virtual helmet 13. The audio signal received by the other microphone 48 (FIG. 3) is converted to an electrical signal and transmitted by another AM frequency to the receiver 20 (FIG. 1) in the operator environment which delivers the signal to the other earphone 19 of the virtual helmet 13. The combined audio signals received by the microphones 48 of the robot 16 thereby provide a sense of direction to which the operator may respond by turning his head "in the direction of the sound". The action of the operator turning his head and thereby turning the helmet 13 activates rotary encoder 26 sensing the position of the helmet 13 (FIG. 2). The encoder 26 transmits a signal to actuators which control the position of the robot head 29 so that the robot turns its head similarly to the operator.

A pair of video robot cameras 22 (FIG. 3) are also mounted on the robot head 29 corresponding to the operator's eyes. A pair of video "operator" screens 24 (FIG. 4) are mounted in the helmet 13. These miniature screens 24 are liquid crystal displays well known in the art and each screen is positioned directly in front of one respective eye of the operator. Because the robot head 29 is under the control of the command station 12 to move in a direction that duplicates the motion of the operator's head, the cameras 22 (FIG. 3) are pointed in a direction in robot space corresponding to the direction of the operators eyes in operator space. Each robot camera 22 is provided with an automatic focusing lens system comprising at least two lenses whose positions relative to one another are adjusted automatically, such as by sonar or infrared optical feedback signals, to focus on the object being viewed. The angle between the lines of sight of the cameras is automatically adjusted depending on the focal lengths of the lens system so that information of the three dimensional characteristics of the object being viewed is generated including the angle between the lines of sight of the cameras. The video information from each camera 22 is relayed through the command system 14 back to a respective screen 24 (FIG. 4) in operator space where the angle A between the lines of sight 23 A and 23 B of the images on the screens is adjusted in response to the video information so that the combined operator screens 24 give a three dimensional image to the operator.

The techniques for measuring angle between the line of sight of the operator's eyes and for automatically adjusting the focal lengths are well known in the photographic arts.

A main purpose of the robot head is to provide a visual interface between the operator and people who encounter the robot. It is intended that the robot of this invention interact frequently with the general population. Therefore it must not intimidate people, and, in fact, be an object of curiosity, functionality and entertainment for the general public. Hence the robot head may project the image of the operator or other images to the viewing public.

The public "communicates" with the robot by means of a touch screen that may be positioned in a location most convenient to the user.

Figure 12:
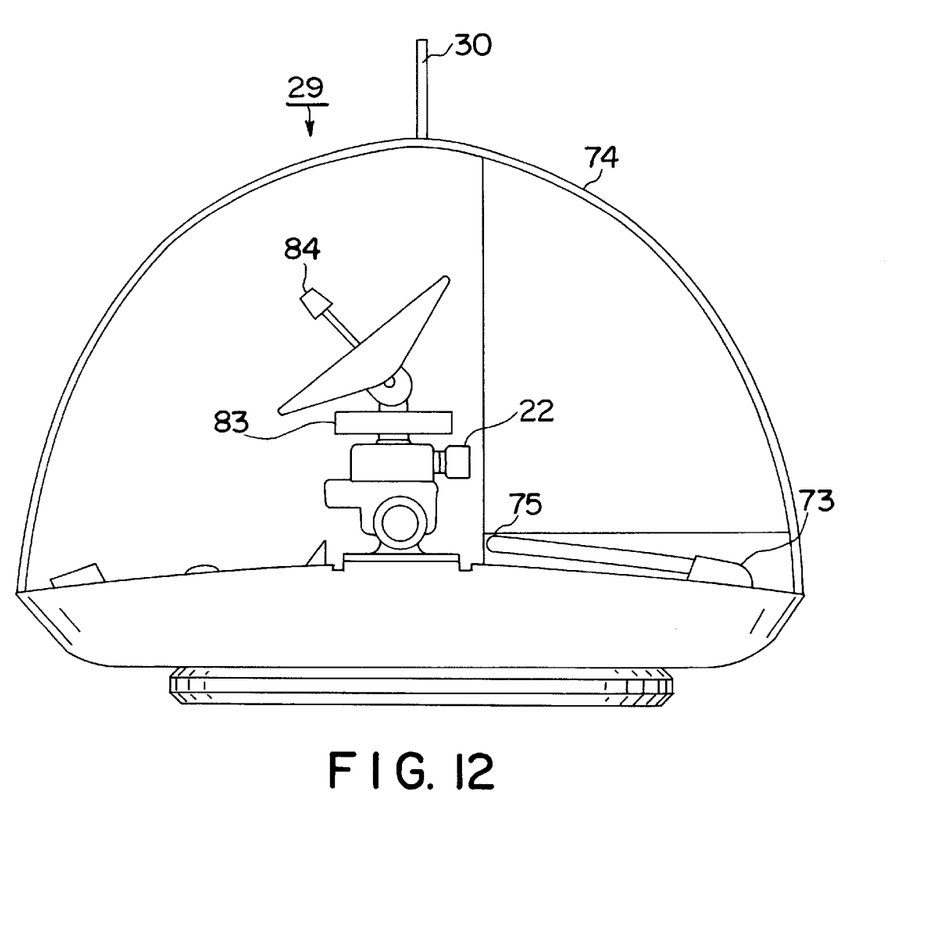
FIG. 12 shows details of the robot head.

FIG. 12 shows to best advantage other features of the robot head 29 for performing the intended functions. Inside the robot head 29 is mounted an image projection system including a display projector 73 which generates a desired image stored in the command station 12 which is then guided to to a screen 74 by a display deflector 75. These parts are analogous to a television's electron beam, phosphor screen, and steering plates. The projector may project an image of the operator's face.

A preferred projection system is a set of lasers (red, green and blue) whose light is deflected onto the dome by a micromachined mirror array such as manufactured by Texas Instruments.

In one embodiment, the video cameras 22 (discussed above in connection with FIG. 3) are hidden inside the head dome 29 together with range/proximity sensors 83 and long range communications antenna 84. The dome 29 is transparent to the cameras 22, and any range sensors 83 inside the dome 29. However, vision through the dome 29 is one way such that people will not see into the dome but will see, instead, the projected image.

Images or sequences of images are stored in the control unit 12 and can be displayed upon command from the operator. In addition, alternatively, the dome 29 is a "touch screen". A viewer can select his own video presentation by contacting the appropriate selection on a menu projected onto the screen. Examples of selected video images may include a person's face, a panel for touch control, broadcast news, scenery, a book, and the like.

Figure 6:
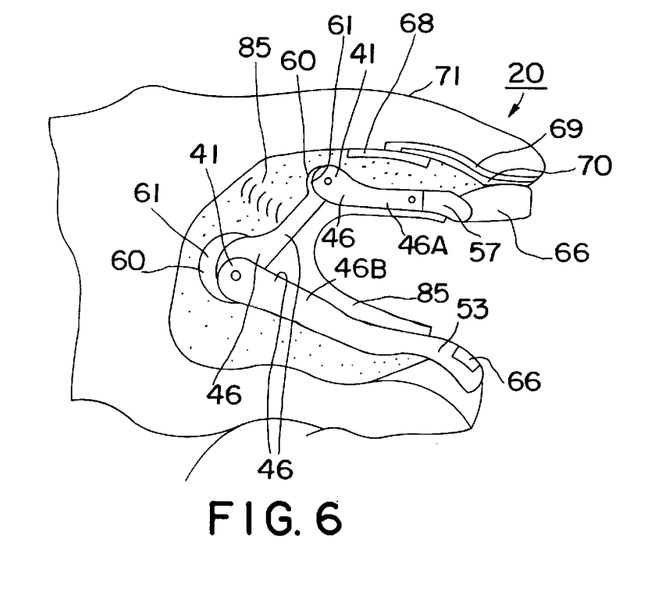
FIG. 6 shows the operator's glove.
Figure 7:
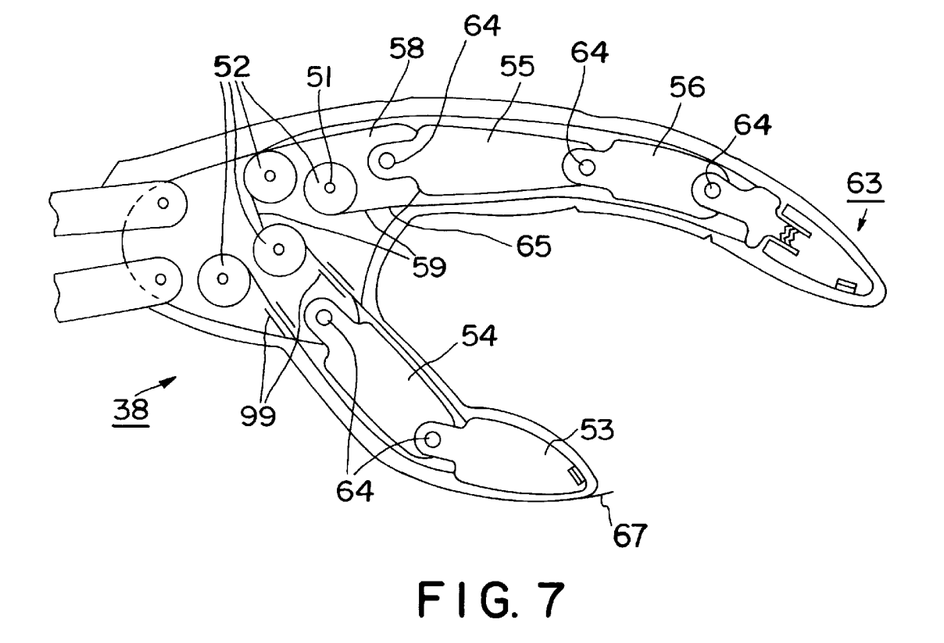
FIG. 7 shows a robot hand.

FIG. 6 shows details of the force reflecting glove 20 attached to the exoskeletal alms 33. and FIG. 7 shows details of the robot hand 38. The force reflecting glove 20 comprises main support members 46 (three members 46 are shown) joined together by links 41 (two are shown). A sensor 61 in each glove senses either the clamping motion or the clamping force exerted by the operator's hand on members 46 thereby causing control unit 12 to provide a commensurate power to actuators 52 in robot hand 38. A brake 60 presents resistance to clamping force exerted by the operator and the magnitude of the braking force is responsive to a clamping force exerted by the robot hand 38 as discussed in more detail below. Sensor 61 may be a force sensor such as conventional ones utilizing strain gages or a motion sensor such as an encoder detecting the relative motion between adjacent member, 46.

FIG. 7 shows details of the robot hand 38 including a thumb comprising links 53 and 54 and a finger comprising links 55, 56 and 63 attached to palm 58. The finger and thumb of robot hand 38 are coupled by drive lines 59 to actuators 52 responsive to signals generated by force of the operators hand on the force sensor 61 in the force reflecting glove as discussed above. FIG. 7 also shows additional features of the robot hand. The finger 63 is broad so that the hand is similar to a mitten. There may be more than one finger and the fingers may be connected in parallel. Each joint 64 is a pin joint or live hinge. In one embodiment, the finger links are geared and equipped with clutches that permit one actuator to close the grasp of the hand. FIG. 7 shows the actuators 52 coupled to the links 55–57 by lines 99 (belts) but it will be understood that gears could be used.

Figure 8:
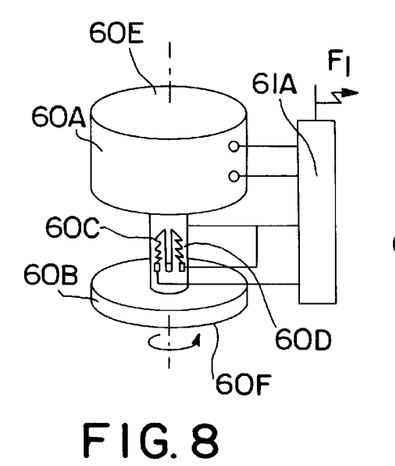
FIG. 8 shows the combination brake and strain gage.

FIG. 8 illustrates details of the combination 60 of a glove force sensor and brake to which a finger link 46A and thumb link 46B are mounted. The brake includes a base section 60A with base surface 60E securely mounted on link 46C and a rotor section 60B including rotating shaft 60D. The outer surface 6OF is coupled to neighboring link 46A or B. A signal $F_2$ from control command center 61A controls the braking resistance to turning of shaft 60D. The actual torque generated by the operator in turning rotor section 60 relative to base section 60A is sensed by strain sensor 60C which sends a torque signal $F_1$ to the control center 61 A for transmission to the control center 61B of the robot hand.

Figure 9:
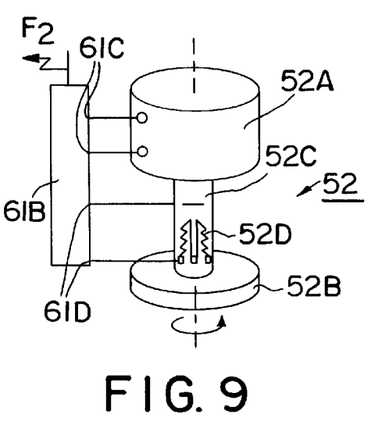
FIG. 9 shows the combination actuator and strain gage.

FIG. 9 illustrates details of the rotary actuators 52 for receiving the clamping force signal $F_2$ and applying clamping force by the finger sections 57 of the robot hand 38. Rotary actuator 52 includes base section 52A, mounted on palm section 58 of the hand and rotor section 52B with rotor shaft 52C rotatably coupled to base section 52A. The rotary actuator 52 receives the turning force signal $F_1$ on terminals 61C causing the rotor section 52B to turn. Resistance to turning (such as when the robot fingers clamp on an object in object space) is sensed by strain gage 52D such as to generate a signal $F_2$.

In operation, the power applied by control unit 12 to actuator 52 will always increase to a value to generate a force delivered from the actuators to the robot hand such that $F'_1 > F'_2 + D$ where D is a preset increment, $F'_1$ is the force (torque) applied by the robot actuators 52 to the robot finger links 55–57 and thumb links 53, 54 and $F'_2$ is the braking force generated by brake 60 in the glove 20 responsive to the robot force sensor 51. The command station 12 is programmed to increase $F'_2$ up to a preset maximum value M. When $F'_2$ reaches a value M, then the control unit will send a "locking" signal to brake 60 so that $F'_1 = M + D$ regardless of how much force the operator applies to the glove.

With the glove-robot hand interaction described above, several conditions are possible when a robot hand grasps an object; for example:

1. When the operator's hand (in the glove 20) begins to close his finger and thumb in a grasping operation, the signal from robot sensor 51 is zero so that the glove fingers will close and the robot fingers will close until contact with the object is made.

2. When the robot makes contact with the object and if the object is yielding but presents a resistive force of $F_2$ to further closing, then the operator will exert a force $F_1$ corresponding to $F_2$ and the fingers will continue to close. If the object has elastomeric properties, then $F_1$ and $F_2$ will continue to increase. The operator may elect to freeze his grasping operation in which case $F_1$, hence $F_2$, will cease to increase.

3. When the object will no longer yield, $F_2$ increases to M and the brake locks preventing further closure of the glove fingers.

The foregoing arrangement is particularly suited to the case where the operator wishes to use the robot hand to pick up an object which requires application of a clamping force equal to $F_2 = F'$. Then the clamping force of the robot hand will never exceed F' regardless of how hard the operator squeezes. If the operator wishes the robot hand to pick up an object, then he can watch the object through his screen and exert enough clamping force in the force glove to prevent the object from slipping from his grasp or he can use a vibration sensor in the glove (discussed below) to detect when the object is slipping from the grasp of the robot hand and adjust his clamping force in the glove to apply sufficient force to prevent slipping.

The finger of the glove is provided with a spring return 85 to return the finger to its retracted position when the operator relaxes his grip.

Figure 10:
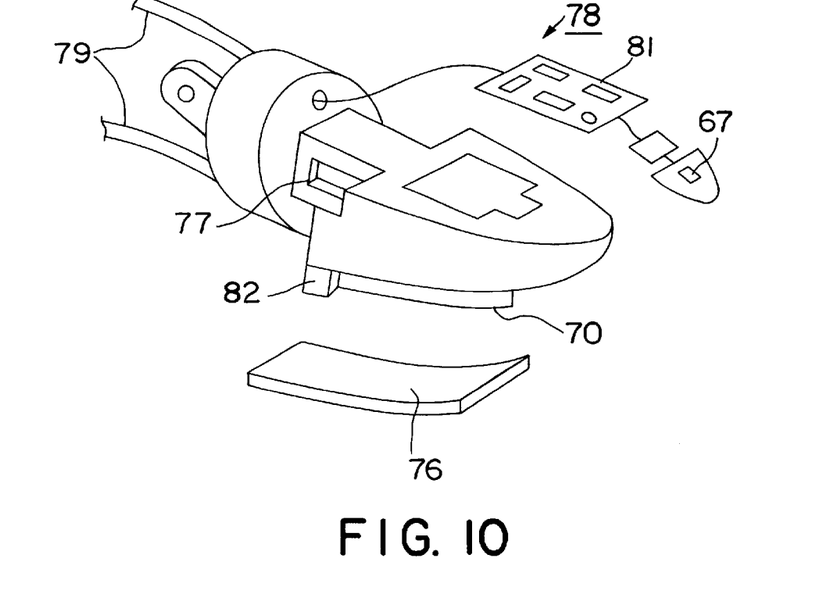
FIG. 10 shows the finger tip of the robot hand.

FIG. 6 also shows the force reflecting glove having vibration actuators 66 (solenoids or piezoelectric bimorphs are preferred) which receive a signal generated by having a roughness sensing stylus 67 located in the finger tip of the robot hand (see FIG. 10) as the finger nail of the robot hand is scraped on a surface in robot space. The roughness sensing stylus 67 in the fingertip of the robot hand is shown in FIG. 10 together with an associated electronics module 81. Measurement of roughness using the roughness sensing nail is well known in the art of measuring surface profiles.

FIG. 10 shows other details of the finger tip 78 which is the last link in the finger of the robot hand and includes sensors to info-n the operator of the robot surroundings. It is driven by cables 79 connected to a motor (not shown) in the palm.

The fingertip includes an integral force sensor 77 to sense tripping force and temperature sensing elements 82 to determine the temperature and heat capacity of an object touched by the finger.

As seen in FIG. 10 showing details of the finger tip in the robot hand and FIG. 6 showing details of the force glove (FIG. 6), the glove 20 also has a thermoelectric cooling element 68 and electric heating element 69 responsive to signals generated by temperature or heat flow sensing elements 76 sensing thermal conditions in surfaces in contact with the finger tip of the robot hand.

An outer glove "skin" covers the operator's hand and is attached to the exoskeletal arm 33.

Figure 11:
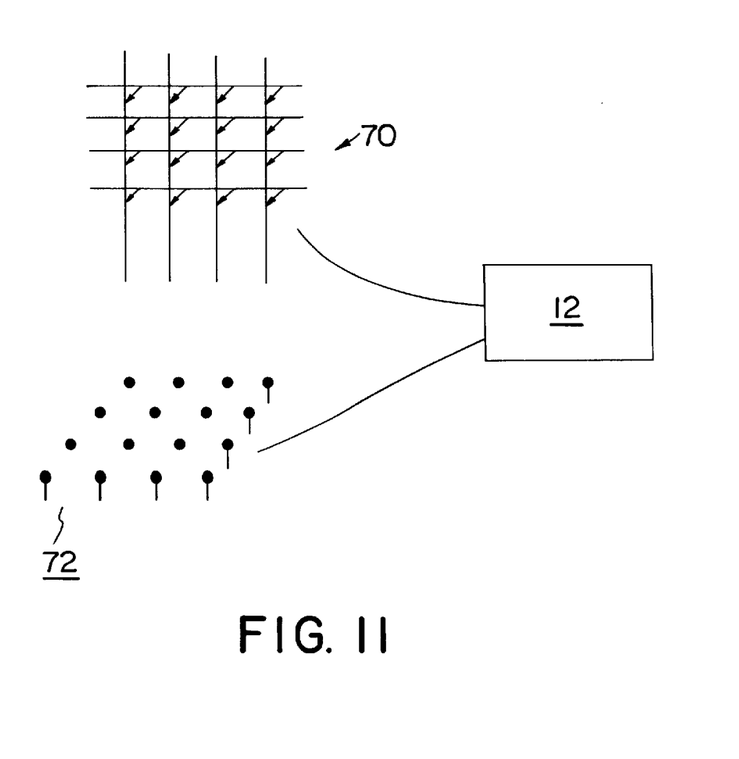
FIG. 11 shows the diode array and pin array for transmitting tactile information.

FIG. 11 shows to best advantage a pin array 72 in the finger of the glove which acts in concert with a tactile feedback array 70 in the finger tip 78 of the robot hand (shown in FIG. 10) to provide to the user a sense of shape of an object in the robot's grasp. FIG. 11 shows a preferred array 70 comprising an array of force sensitive resistors (FSR). Sixteen FSRs are arranged on a 4×4 grid. The resistance of each FSR is scanned by successively measuring resistance between successive x and y contacts with the surface of the array pressed against the surface being studied. An uneven pressure on the array causes a pattern of resistances, $R_{xy}$ throughout the allay in proportion to the contour of the surface forced against the array. Values of $R_{xy}$ are stored in memory in the control unit 12. FIG. 11 shows the pin array 72 with pins arranged in rows and columns. Each pin is extended in a direction perpendicular to the pin array in accordance with a signal from the control unit sent to the pin address. The patterned extension of the pins in the array is accomplished by piezoelectric or electromagnetic means well known in the printing and typewriter art.

Variations and modifications of the invention may be suggested by reading the specification and studying the drawings which are within the scope of the invention.

For example, FIG. 7 shows the actuators 52 coupled to the links 55–57 by lines 59 (belts) but it will be understood that gears could be used.

Angle sensors may be installed to measure the angles at any one or more joints.

The actuators may be in either the palm of the robot hand or in the forearm.

The fingers may be equipped with springs at each joint so that only gripping force is driven by the motors. The opening force is applied by springs.

The skin may be liquid tight and filled with dielectric fluid. The fluid gives the hand compliance and also serves to cool the internal electronics. Alternatively, foam may be used under the skin to give the hand coinpliance. The finger links are hollow to accommodate electronics for sensors and possibly actuators or power sources.

The image projected onto the dome from inside the dome may be holographic and three dimensional, viewable from any direction and angle.

The image display may be a simple flat screen and two dimensional only.

The robot head may contain a speaker and microphones for audio input/output.

Sensors may be mounted in the robot body with corresponding actuators attached to the exoskeletal arm and chair.

The image may be displayed in one direction but the vision system may be pointing in another direction. There is no necessary correspondence between the image and vision system directions (unlike a human whose face direction is the same as his eye direction).

The dome has a touch screen with a "touch" button "menu for operating a distant device.

The robot may be equipped with gyros for stabilization.

Solar cells may be mounted on the robot body to store energy for the electronic circuits or flexible polymer solar cells can be made into robot "clothing".

The robot has an internal storage battery for operating the circuits.

Primary power may be provided by a hybrid generator. The robot may also recharge itself by plugging into a standard wall receptacle.

The command and sensing signals between the robot and the control module may be transmitted either over cables or by wireless means.

In view of these and other possible variations and modifications, we therefore wish to define our invention by the scope of the appended claims

What is claimed is:

1. A robot system which comprises:
  a robot means, adapted for being located in a robot environment, for performing tasks in response to control signals received by said robot means;
  said robot means including means for generating sensation signals responsive to said robot environment and robot control means for controlling said robot means;
  command means adapted for being located in a command environment remote from said robot environment, for generating command signals responsive to a position and movement pattern of an operator;
  communication means for receiving said command signals, converting said command signals to said control signals, and transmitting said control signals to said robot means to control said robot to substantially duplicate motion of said pattern;
  said robot control means being receptive to said control signals;
  said communication means including means for converting said sensation signals to sensation causing effects detectable by said operator.

2. The robot system of claim 1 comprising:
  a robot body;
  at least one mechanical arm means joined at one end to said robot body and corresponding to one operator alum of said operator respectively and for duplicating movement of said respective one operator arm in response to arm command signals;
  said command control means having means for generating a plurality of arm command signals responsive to position and movement of said operator arm;
  said communication means having means for converting said arm command signals to arm control signals and transmitting said arm control signals to said robot means.

3. The robot system of claim 2 wherein said command means comprises:
  a base;
  an exoskeleton arm having an upper arm section with an elbow end rotatably attached to an elbow end of a forearm section;
  a hand end rotatably mounted to said forearm section;
  means for attaching said aim of said operator to said exoskeleton arm
  said upper arm section having a shoulder end rotatably attached to said base.

4. The robot system of claim 3 wherein said base is a chair.

5. The robot system of claim 2 wherein said means for generating a plurality of arm command signals responsive to position and movement of said operator arm is at least one rotary encoder, each one of said at least one rotary encoder coupled between at least one of:
  (i) said base and said upper aim section;
  (ii) said tipper arm section and said forearm section;
  (iii) said forearm section and said hand end.

6. The robot system of claim 3 comprising:
  a glove means having a thumb section and at least one finger section and attached to a hand end of said forearm section operably arranged to enable said operator to position himself above said base with said operator's hand in said glove;
  grasping motion signal means positioned in said glove for generating a grasping motion command signal responsive to grasping motion generated by a thumb and fingers of said hand end;
  said communication means has means for converting said grasping motion signals generated in said glove means to grasping motion command signals transmitted to said robot hand means;
  said robot means has a robot hand means adapted for grasping objects in robot space with a grasping motion in said robot hand responsive to grasping motion control signals emitted by said communication means.

7. The robot system of claim 6 wherein said grasping motion signal means in said glove comprises encoder means in said finger section and thumb section of said glove means for generating grasping motion signals in response to motion applied by said operator to said finger means and thumb means of said glove means.

8. The robot system of claim 7 comprising:
  means for generating grasping force signals responsive to said grasping motion by said robot hand
  a brake means for applying a resistance force to closing said finger section and said thumb section;
  said resistance force being responsive to said grasping force signals.

9. The robot system of claim 8 wherein said control means comprises:
  means for adjusting said resistance force to a value that is less than a corresponding value of force applied by said operator to said glove means by a preselected increment when said resistance force is in a range from zero force to a preset value of resistance force;
  means for applying a clamping force signal to said brake means such that said finger means and thumb means are immobile when resistance force exceeds said preset value of resistance force.

10. The robot system of claim 6 comprising:
  sensation signal means located in said robot hand for generating sensation signals responsive to conditions that stimulate at least one human sense when a human hand is in said robot environment in the vicinity of said robot hand;
  said communication means having means for converting said sensation signals to sensation command signals;
  sensation creation means in said glove responsive to said sensation command signals operably arranged to create sensory sensations detectable by said operator hand in said glove.

11. The robot system of claim 10 wherein at least one human sense is selected from a group of senses that consist of senses responsive to force, pressure, temperature, heat flow, vibration and surface roughness.

12. The robot system of claim 1 comprising:

said robot means having a rotatable robot head;

said robot means having a pair of microphones;

one microphone of said pair of microphones on one side of said robot head and another microphone of said pair of microphones mounted on an opposite side of said robot head;

each microphone having, a directional response characteristic;

said control means having one earphone adapted for being worn against one ear of said operator and another earphone adapted for being worn against another ear of said operator;

means for transmitting one audio signal from said one microphone to said one earphone and another audio signal from said another microphone to said another earphone whereby said user wearing said pair of earphones experiences a combined audio signal having a directional characteristic.

13. The robot system of claim 1 comprising:

said robot means having a rotatable robot head;

a pair of video cameras rotatably mounted on said robot head and spaced from one another:

said control means having a helmet adapted for being worn by a user;

a pair of video monitor screens rotatably mounted on said helmet;

each screen positioned in front of and proximal to a respective eye of a user;

means for delivering an one image from one camera to one screen and another image from said another camera to said another screen adjusting an angle between lines of sight of said pair of video screens and lines of sight of said pair of video screens relative to lines of sight of said operator's eyes such that said user perceives three dimensional information.

14. The robot system of claim 11 wherein said at least one human sense is responsive to temperature of a surface and said sensation signal means is a thermocouple positioned in a finger of said robot hand and operably arranged for contacting said surface and said sensation creation means is one of a heater and cooler positioned in said glove.

15. The robot system of claim 11 wherein said at least one human sense is responsive to surface roughness and said sensation signal means comprises:

a stylus mounted on said robot hand and adapted for sliding a tip of said stylus on said surface;

a microphonic transducer means operably arranged with said stylus to convert vibrations induced in said stylus sliding on said surface to said sensation signal.

16. The robot system of claim 1 wherein:

said control means comprises means for generating video message signals;

said communicating means comprises means for converting said video message signals to video display signals;

said robot means comprises means adapted for presenting video display responsive to said video signals.

17. The robot system of claim 16 wherein said means adapted for presenting video display comprises:

a dome means constructed for presenting said video display on an outside or inner surface of said dome means such that said display is visible from a position outside said dome means;

a video projection means inside said dome means for projecting said video display onto said outside or inner surface of said dome means.

18. The robot system of claim 17 wherein said video display comprises a liquid crystal screen.

19. The robot system of claim 17 where said video display is a video monitor screen.

20. The robot system of claim 16 wherein said means adapted for presenting video display comprises a holographic image projection system.

21. The robot system of claim 1 wherein:

said control means comprises means for generating audio message signals; and said communicating means comprises means for converting said audio message signals to audio signals; and said robot means comprises means adapted for emitting sound signals responsive to said audio signals whereby other humans in said robot environment are able to receive said sound signals.

22. The robot system of claim 12 which comprises a helmet means for supporting said microphonic transducer proximal to an operators ears.

23. The robot system of claim 12 which comprises a helmet means for supporting said video camera within eyesight of said operator.

24. The robot system of claim 10 wherein said sensation signals are analog signals and said communication means comprises:

means for converting said analog signals to digital signals:

wireless means adapted for transmitting said digital signals to a receiver means;

receiving means for receiving said digital signals;

means for converting said digital signals back to said sensation detection signals in analog form.

25. The robot system of claim 2 wherein said one mechanical arm means comprises:

at least one elongated member, each member joined to an end of another member beginning with a first member having one end joined to said robot body and ending with a last elongated member having an end opposite said respective joint connected to a robot hand;

at least one actuating motor means, one for each elongated member and located at said end of each said elongated member joining an elongated member.

* * * * *